Patented May 28, 1940

2,202,632

UNITED STATES PATENT OFFICE 2,202,632

COLORING MATTERS OF THE PHTHALO-CYANINE TYPE

Isidor Morris Heilbron, Manchester, England, Francis Irving, Grangemouth, Scotland, and Reginald Patrick Linstead, London, England, assignors to Imperial Chemical Industries Limited, a corporation of Great Britain No Drawing. Application May 14, 1936, Serial No. 79,814. In Great Britain November 16, 1932

10 Claims. (Cl. 260—314)

This application relates to the manufacture of coloring matters of the phthalocyanine series, and constitutes a continuation-in-part of our copending application, Serial No. 698,216, filed November 15, 1933 (2,116,602 issued May 10, 1938).

It is an object of this invention to provide an improved process for the manufacture of coloring matters of the phthalocyanine series. Other and further important objects of this invention will appear as the description proceeds.

In British patent specification No. 322,169 there is described a process for the production of blue to green coloring matters by heating phthalic anhydride with ammonia and certain metals or metal compounds including iron, cuprous chloride and nickel sulphide. In British patent specification No. 389,842, (corresponding to U. S. Patent No. 2,000,051) there is described a process for the production of nitrogen-containing coloring matters of complex constitution which comprises heating an o-cyanoarylcarboxyamide in the presence of specified metals and metal compounds. These coloring matters are described as purple to green in color and stated to appear to belong to one general class, this class appearing to include the said coloring matters of British patent specification No. 322,169. British patent specification No. 389,842 also describes the production of metal-free coloring matters and gives probable formulae for a coloring matter containing magnesium and the corresponding metal-free coloring matter.

British patent specification No. 390,149 (corresponding to U. S. Patent No. 2,000,052) describes the production of the same coloring matter containing magnesium and the corresponding metal-free coloring matter and of substituted derivatives of these by heating a phthalimide with ammonia and magnesium or antimony.

As described in the last mentioned patent, the metal-free compound may be produced either directly by heating a phthalimide with antimony, or indirectly, that is by first heating the phthalimide with magnesium to produce a magnesium-containing compound, and then eliminating the magnesium by precipitation from concentrated sulfuric acid.

We have now found that coloring matters of the same general series may be obtained by heating an o-arylene-dicyanide with a metal of the second group of the Periodic Table or a compound of such metal. For instance, when phthalonitrile is heated with zinc chloride at about the boiling point of the former and in the proportion of from 1 to 2 moles of the latter for each 4 moles of the former, a greenish pigment is obtained containing combined zinc. It is, apparently, zinc phthalocyanine. When phthalonitrile and magnesium metal are heated under similar conditions, a magnesium-containing phthalocyanine is obtained of the probable empirical formula $(C_8H_4N_2)_4Mg$. If the latter is dissolved in concentrated sulfuric acid, and reprecipitated by dilution with ice, a metal-free phthalocyanine is obtained, which appears to be identical with that obtainable in U. S. Patent No. 2,000,051, Example 7.

In like manner, calcium, barium, or compounds thereof give upon heating with phthalonitrile a phthalocyanine containing the corresponding metal, from which, however, it readily parts upon precipitation from concentrated sulfuric acid.

The heating may be effected immediately between the o-arylene-dicyanide and the metal or metal compound, or it may be carried out in the presence of a suitable solvent or diluent. High boiling inert organic solvents, such as naphthalene or methyl naphthalene are particularly suitable for this purpose. Tertiary bases, such as quinoline, pyridine, or dimethylaniline may also be employed. If desired, ammonia gas may be circulated through the reaction mass. With the alkaline earth metal, where the metallic form of the reagent is employed, it is preferable to carry out the reaction in alcohol, especially amyl alcohol (normal or iso) or cyclohexanol.

The temperature of the reaction will depend on the boiling point of the mixture employed, and will generally be within the range of 150 to 400° C.

The reaction is applicable to substituted phthalonitriles, such as halogen, methyl or nitro-phthalonitriles, as well as to the o-dinitriles of naphthalene and anthracene. Thus pigments containing zinc can be made from zinc chloride and chloro- or dichloro-phthalonitrile or nitro-phthalonitrile or from other metals or metal compounds with similar nitriles.

The so-obtained coloring matters are typically blue to green in shade, have only little or no solubility in organic solvents, but dissolve in concentrated sulfuric acid and are decomposed by nitric acid. They contain nitrogen, are of complex constitution and contain the respective metal in combined form. However, except for the coloring matter containing zinc the metal readily splits off upon precipitation from concentrated sulfuric acid.

The magnesium-containing compound from phthalonitrile and magnesium is the same as the magnesium-containing one described in British specifications Nos. 389,842 and 390,149.

Working according to this new process the coloring matters are, generally speaking, formed with greater readiness than according to those of the above-mentioned specifications and higher yields, in some cases nearly the theoretical, are obtained. Purification may be effected as already described in the said specifications, i. e. by recrystallisation, sublimation or washing with liquids which will dissolve impurities.

The coloring matters may be employed as pigments. For instance, they may be made into lakes with the usual substrata. Such lakes may be used as coloring matters for varnishes and inks.

The following examples in which parts are by weight illustrate but do not limit the invention.

*Example 1*

5 parts of calcium turnings, 240 parts of amyl alcohol and 100 parts of phthalonitrile are mixed and refluxed for 5 hours. The mixture is allowed to cool, diluted with alcohol, the insoluble matter filtered off and washed with cold dilute hydrochloric acid, hot water and alcohol and dried. The dry substance is green in color, insoluble in quinoline and other organic liquids and contains combined calcium.

The calcium-containing compound is converted to the metal-free one by dissolving it in concentrated sulphuric acid, pouring the solution into water, filtering off the precipitate, washing and drying. The dry metal-free compound is greenish-blue in color.

*Example 2*

12.8 parts of phthalonitrile are ground and intimately mixed with 2.8 parts of calcium oxide and the mixture heated at 260° C. with stirring for 1 hour. The resulting solid or semi-solid is cooled, ground, and the ground material washed with boiling alcohol and then with cold dilute hydrochloric acid, and water and dried. The resulting compound contains calcium and is the same as the corresponding compound of Example 1.

*Example 3*

15 parts of phthalonitrile are ground and intimately mixed with 7.5 parts of baryta (BaO) and the mixture heated at 290° C. for 2 hours. The resulting mass is allowed to cool, ground, extracted with boiling alcohol and dried. The dry substance consists of a coloring matter containing combined barium contaminated with a little baryta.

The barium-containing compound is converted to the metal-free one by heating with dilute hydrochloric acid, filtering, washing with dilute hydrochloric acid to remove any residual traces of barium compound, washing with water and drying. The dry substance is greenish-blue in color.

*Example 4*

6.5 parts of phthalonitrile and 4 parts of anhydrous barium chloride are heated with stirring at about 300° C. for several hours. The resulting mass is cooled, ground and extracted with boiling alcohol and dried.

*Example 5*

12.8 parts of phthalonitrile are mixed with 1.2 parts of magnesium powder (the magnesium powder having been shaken up with dilute hydrochloric acid, washed and dried immediately before use in order to give a clean metallic surface) are heated with stirring at about 270° C. for several hours. The resulting mass is allowed to cool, ground, extracted with boiling alcohol, and cold dilute hydrochloric acid, and water and dried. The resulting compound contains magnesium and is the same as the magnesium-containing compound described in British patent specification No. 389,842.

*Example 6*

0.5 part of magnesium oxide is added to a solution of 2 parts of phthalonitrile in 5.5 parts of quinoline and the mixture is heated for several hours at 220–230° C., while a stream of ammonia is passed through. The resulting mass is cooled, diluted with acetone, the solid matter filtered off, washed repeatedly with acetone, and then extracted with warm dilute hydrochloric acid, washed with water and dried. The product contains magnesium and is the same as that of Example 5.

*Example 7*

12.8 parts of phthalonitrile are mixed with 3.2 parts of zinc dust and heated at 240° C. with stirring for 3 hours. The resulting mass is cooled, ground, extracted with alcohol and dilute hydrochloric acid and water and dried. The dry material is finally purified by recrystallising from quinoline.

The recrystallised material is greenish-blue and analysis shows that its composition corresponds to $(C_8H_4N_2)_4Zn$. Sulphuric acid does not remove zinc from this compound but forms a green addition compound with it. Other acids, for example hydrochloric and hydrobromic also form addition compounds. These addition compounds with sulphuric or other acids are reconverted to the initial compounds on treating with alkalies.

*Example 8*

12.8 parts of phthalonitrile and 3.4 parts of zinc chloride are heated together with stirring at 230–240° C. for about half an hour. The resulting solid mass is cooled, ground, extracted with boiling alcohol, and dried. The dry substance is green and analysis shows that its composition is $$C_{32}H_{16}N_8ZnCl_2.$$

On treatment with sodium hydroxide it yields a bluer compound of composition $C_{32}H_{15}N_8ZnCl$. This bluer compound on treating with hydrochloric acid reverts to the initial compound. The initial compound appears to be zinc monochlorophthalocyaninehydrochloride, $$(C_6H_4C_2N_2)_3(C_6H_3ClC_2N_2)ZNHCl,$$

and the second compound to be $$(C_6H_4C_2N_2)_3(C_6H_3ClC_2N_2)Zn.$$

On treating either of these compounds with concentrated sulphuric acid a compound which appears to be the corresponding sulphate is obtained. Similar compounds may be obtained with other acids.

*Example 9*

10 parts of phthalonitrile and 2.5 parts of cadmium filings are heated with stirring at 290° C. The resulting mass is allowed to cool, extracted with boiling alcohol and freed from uncombined cadmium by stirring up the ground mixture with alcohol and pouring off the alcohol from the cadmium before the pigment has settled. The product obtained in this way is green, and is insoluble in quinoline and other organic liquids.

The cadmium-containing compound is converted to the metal-free one by dissolving it in concentrated sulphuric acid, pouring the solution into water, filtering off the precipitate, washing and drying. It is greenish-blue in colour.

Example 10

12 parts of phthalonitrile and 3 parts of cadmium oxide (CdO) are intimately mixed and heated together with stirring at about 250° C. for 1 hour. The mixture is allowed to cool, extracted with boiling alcohol and dried. The dry substance is the cadmium-containing compound described in Example 9.

Example 11

20 parts of phthalonitrile and 3 parts of beryllium powder (the beryllium powder having been shaken up with dilute hydrochloric acid, washed and dried, immediately before use in order to give a clean metallic surface) are mixed and the mixture gently boiled. After about half an hour the mixture becomes semi-solid and after 1 hour the mixture is allowed to cool, ground and the residual beryllium metal removed in a similar way to that of Example 9. The resulting product is then extracted with alcohol and sublimed. The sublimed product is in long flat needles and is blue and has the composition $$C_{32}H_{16}N_8Be.$$

In a moist atmosphere it absorbs water and gives a blue powder, which is the dihydrate. The sublimation referred to above may be replaced by crystallising from boiling quinoline or pyridine, except that the bluer compound then obtained contains solvent of crystallisation.

The metal-free compound is obtained by dissolving the sublimed material in concentrated sulphuric acid, pouring the solution into water, filtering off the precipitate, washing and drying.

Example 12

16.26 parts of 4-chlorophthalonitrile are ground and intimately mixed with 3.4 parts of anhydrous zinc chloride. The mixture is heated with stirring at 230–240° C. for 2 hours. The resulting mass is cooled, ground, extracted with boiling alcohol and dried.

It will be understood that the details of procedure given above, for instance as to solvent employed, temperature and duration of the reaction, method of extraction and purification, etc., may be interchanged between the various examples, and may be varied further within wide limits, without departing from the spirit of this invention.

We claim:

1. The process of producing coloring matters of the phthalocyanine series, which comprises heating an o-arylene-dicyanide at a temperature between 150° and 400° C. in the presence of a metalliferous reactant the metal of which belongs in the second group of the periodic table of elements.

2. The process of producing coloring matters of the phthalocyanine series, which comprises heating an o-arylene-dicyanide at a temperature between 150° and 400° C. in a solvent boiling above 150° C., in the presence of a metal compound capable of yielding an element of the second group of the periodic table.

3. The process of producing coloring matters of the phthalocyanine series, which comprises heating phthalonitrile and an oxide of a metal of the second group of the periodic system, at about the boiling point of the reaction mass.

4. The process of producing coloring matters of the phthalocyanine series, which comprises heating phthalonitrile and zinc chloride in the ratio of from 1 to 2 moles of the latter for each 4 moles of the former, at about the boiling point of the reaction mass, and recovering the solid pigment thus produced.

5. The process of producing coloring matters of the phthalocyanine series, which comprises heating phthalonitrile with magnesium oxide in a medium of quinoline, at a temperature of about 220° to about 230° C., and recovering the solid reaction product.

6. The process of producing coloring matters of the phthalocyanine series, which comprises heating phthalonitrile and metallic calcium in amyl alcohol at about the reflux temperature of the mixture, and recovering the solid reaction product.

7. A process as in claim 4, followed by the step of purifying the reaction product by recrystallisation from sulfuric acid.

8. A pigment of the phthalocyanine series containing combined zinc.

9. Zinc pthalocyanine, corresponding in constitution to the empirical formula $(C_8H_4N_2)_4Zn$.

10. The process of producing coloring matters of the phthalocyanine series, which comprises heating phthalonitrile and a halide of a metal of the second group of the periodic system, at about the boiling point of the reaction mass.

ISIDOR MORRIS HEILBRON.
FRANCIS IRVING.
REGINALD PATRICK LINSTEAD.